United States Patent [19]

Krampe et al.

[11] 4,353,015
[45] Oct. 5, 1982

[54] APPARATUS FOR CHANGING THE RELATIVE PHASE ANGLES OF OUTPUT SHAFTS OF A MULTIPLE MOTOR ELECTRIC DRIVE

[75] Inventors: Dietrich Krampe, Neunkirchen; Herbert Schleicher, Dettlingen, both of Fed. Rep. of Germany

[73] Assignee: Siemens Aktiengesellschaft, Munich, Fed. Rep. of Germany

[21] Appl. No.: 266,582

[22] Filed: May 22, 1981

Related U.S. Application Data

[63] Continuation of Ser. No. 19,562, Mar. 12, 1979, abandoned.

[30] Foreign Application Priority Data

Mar. 15, 1978 [DE] Fed. Rep. of Germany ....... 2811292

[51] Int. Cl.³ .............................................. H02P 1/54
[52] U.S. Cl. ........................................ 318/41; 318/49; 318/50; 318/112
[58] Field of Search ...................... 318/34, 46, 47, 74, 318/85, 41, 71, 314, 321, 437, 341; 307/84–87

[56] References Cited

U.S. PATENT DOCUMENTS

| | | | |
|---|---|---|---|
| 3,428,821 | 2/1969 | Ruffieux | 307/87 |
| 3,621,348 | 11/1971 | Uchida et al. | 318/85 X |
| 3,675,098 | 7/1972 | Heiberger | 318/85 |
| 3,753,002 | 8/1973 | Jacobson et al. | 307/87 |
| 3,908,132 | 9/1975 | Krampe et al. | 307/87 |
| 3,967,170 | 6/1976 | MacDonald et al. | 318/85 |
| 3,991,350 | 11/1976 | Miyagoshi | 318/85 |

Primary Examiner—Ulysses Weldon
Attorney, Agent, or Firm—Kenyon & Kenyon

[57] ABSTRACT

An apparatus for changing the relative angles of the output shafts of a multiple-motor electric drive. For this purpose, the appropriate synchronous motor is switched to a phase-shifting frequency changer and its relative shaft (mechanical phase) angle is shifted by varying the frequency. The synchronous motor is then switched back to the operating frequency changer. The phase equality of the output voltages of the two frequency changers is monitored by signals derived from logic elements driving the frequency changers. In normal operation, the phase shifting frequency changer is driven by the same digital frequency generator as the operating frequency changer and is only switched to another frequency generator for phase shifting. Transition from one frequency changer to the other is made without shock.

6 Claims, 3 Drawing Figures

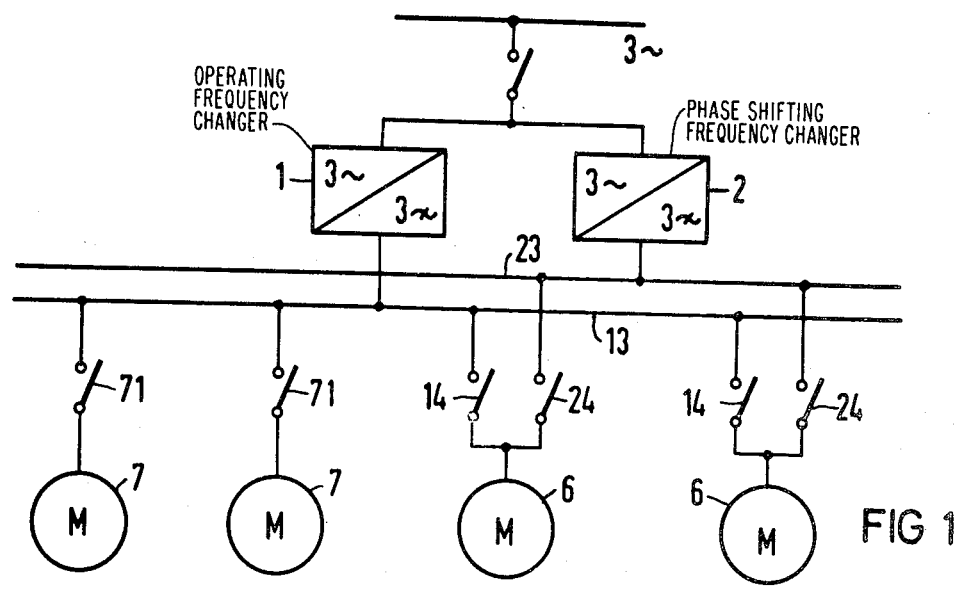
FIG 1
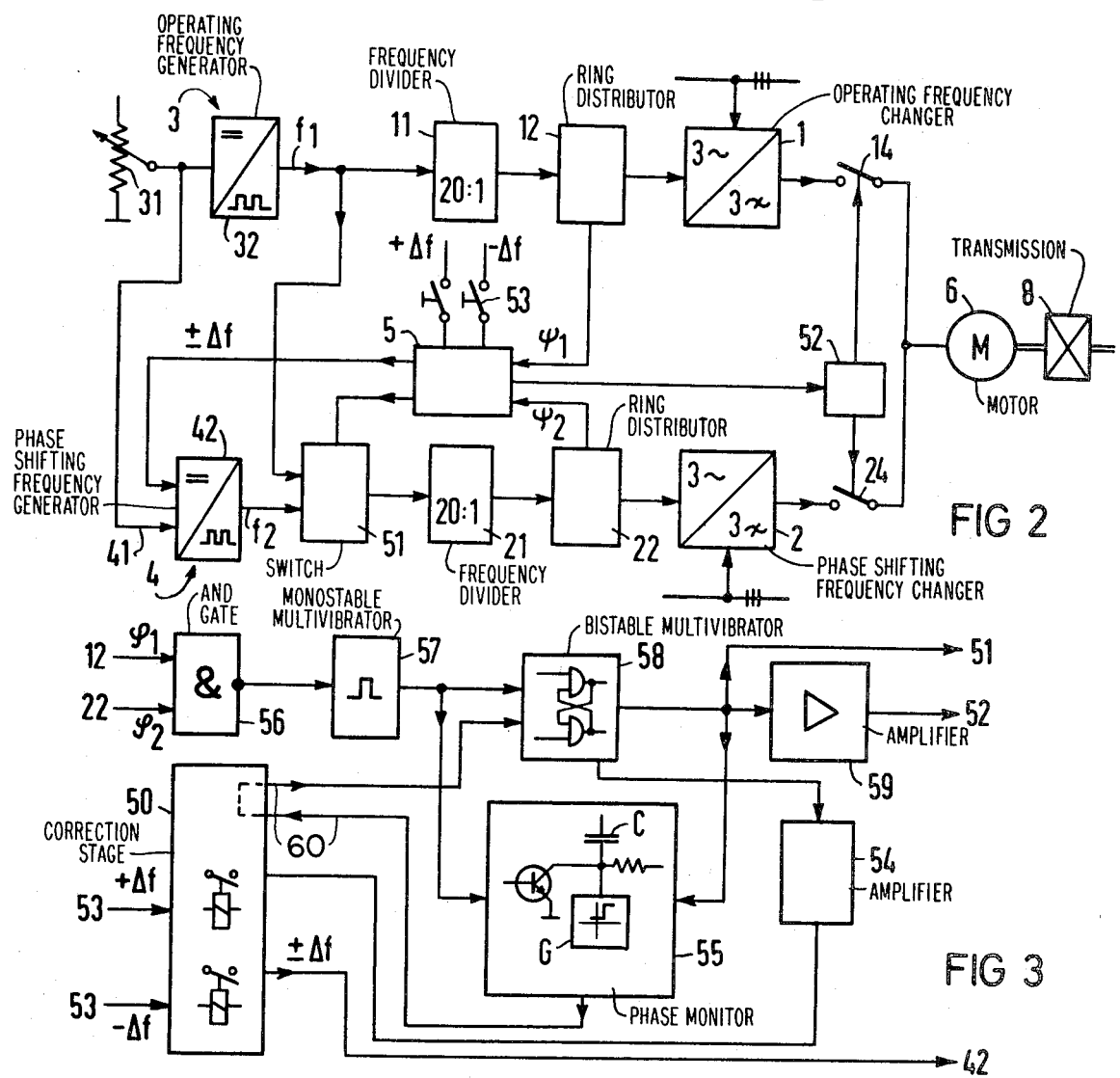
FIG 2
FIG 3 and voltage-frequency converter 32, are fed via frequency divider 11, which has a dividing ratio of, say, 20:1, to a ring distributor, or logic part, 12. Ring distributor 12 constitutes an essential part of the control logic of the frequency changer 1; it controls the delivery of firing commands to the thyristors and thereby determines the frequency and phase of the output voltage of operating frequency changer 1.

Ring distributor 22 of phase-shifting frequency changer 2 can be connected to frequency generator 3 and, therefore, supplied with frequency f1 via electronic switch 51 and frequency divider 21, which, like divider 11, has a division ratio of 20:1. Ring distributor 22 can also be connected to, and driven by, a second frequency generator 4 by means of switch 51. Frequency generator 4 comprises a voltage frequency converter 42, which also receives control voltage from potentiometer 31 via line 41. Thus, the frequency generator 4 delivers approximately the same control frequency as frequency generator 3. Operation of switch 51, control of interlock 52, and movement of the output frequency of frequency generator 4 away from that established by potentiometer 31 are all accomplished by phase synchronizer 5, which takes into account the states of ring distributors 12 and 22.

Operation of the phase shifting process with respect to an individual motor 6 will now be explained in greater detail with reference to FIG. 2.

Operating frequency changer 1 and phase-shifting frequency changer 2 are connected to the three-phase supply network and run at the operating frequency f1 given by the frequency generator 3. Since both frequency changers are supplied with the same control frequency, their output frequencies are equal.

The phases $\psi_1$ and $\psi_2$ of ring distributors 12 and 22 are continuously compared to insure agreement as to phase at the output terminals of the two frequency changers; i.e., that the phases are equal. When equality is reached and continuously indicated by phase controller 55, the interlock device 52 releases switches 14 and 24. Synchronous motor 6 can thus be directly connected via switch 14 to operating frequency changer 1 after the converters are switched on. Operating frequency changer 1 runs at frequency f1 and synchronizes motor 6 with its logic network. To change the phase of motor 6 and thereby, the mechanical angle of its output shaft, control of the speed of motor 6 is transferred from operating frequency changer 1 to phase-shifting frequency changer 2 by opening switch 14 and closing switch 24. Because of the existing frequency and phase equality between ring distributors 12 and 22, the transfer is accomplished without shock and without angle error. When the condition of frequency and phase equality is not met, as determined in phase synchronizer 5, interlock device 52 is immediately activated and the switching transfer is blocked.

By operating one of the push buttons 53 for $+\Delta f$ or $-\Delta f$, the input to phase shifter frequency changer 2 is disconnected from frequency generator 3 and switched, by means of switch 51, to frequency f2 supplied through frequency divider 21 from frequency generator 4. As a result of the switchover, a supplemental reference value $+\Delta f$ or $-\Delta f$ is fed to voltage-frequency converter 42 which results in acceleration or deceleration of synchronous motor 6. The largest angle error which can occur when switching from frequency generator 3 to frequency generator 4 has no effect on the power part, since the switched frequency signal is of a much higher frequency than the control frequency of the ring distributors, being established by the divider ratio of frequency dividers 11 and 21. A maximum switching error of 60°/20, or 3 degrees, is thus possible, in the worst case. When the output shaft driven by the synchronous motor has reached the appropriate position angle, the command $\pm \Delta f$ given via pushbuttons 53 is cancelled. Frequency generator 4 now runs at approximately the frequency of frequency generator 3, plus a definite drift frequency. Phase synchronizer 5 continuously interrogates phases $\psi_1$ and $\psi_2$ of ring distributors 12 and 22, respectively, and switches frequency switch 51 from frequency generator 4 to frequency generator 3 within one cycle (frequency period), when there is agreement. Absolute synchronism is thereby established by electrical means.

As a precaution against possible false pulses in the frequency channel of the phase-shifting frequency changer or of the operating frequency changer, both ring distributors 12 and 22 are monitored for phase equality. This automatic interrogation is particularly important if the idling phase shifter frequency changer has not been used for an extended period of time, say, for several days. When phase equality is disturbed, phase synchronizer 5 causes frequency switch 51 to switch from frequency generator 3 to frequency generator 4. The idling phase shifter frequency changer 2 is then phase-shifted by frequency generator 4 until it is ascertained that synchronism between ring distributors 12 and 22 is re-established. Establishment of synchronism is then followed immediately by switching of frequency switch 51 from frequency generator 4 back to frequency generator 3.

In each case, non-agreement of phase leads to immediate blocking of actuation of switches 14 and 24 by phase synchronizer 5.

The design of phase synchronizer 5 will be explained in detail with reference to FIG. 3. As can be seen, square wave pulses coming from ring distributors 12 and 22 are fed to a coincidence element 56. As long as the respective square wave pulses overlap, i.e., as long as there is phase equality, an output pulse is present at the output of this coincidence detector. The output pulse of coincidence element 56 is stretched by means of monostable multivibrator 57 and is then fed to the input of bistable multivibrator 58. One output signal of multivibrator 58 is fed through amplifier 59 to release the interlock device 52. The same output signal is fed to frequency switch 51 to activate it and connect both frequency changers to frequency generator 3. The output signal also charges capacitor C in automatic phase monitor 55. Capacitor C is periodically discharged by the output signal of multivibrator 57, so that its voltage cannot exceed a given value. If synchronism of the frequency changers is disturbed, the voltage on capacitor C rises and trips limit detector G in phase monitor 55, which, acting through correction stage 50 via line 60, causes multivibrator 58 to flip to the other condition, cancelling the first output signal. The release of interlock device 52 is thereupon cancelled and switch 51 is activated to cause each frequency changer to again operate with its own frequency generator 3 or 4, respectively. Because of the pre-established drift between the two frequencies, the overlap condition is re-established and the circuit is then restored its original position.

When a correction $\pm \Delta f$ is entered into correction stage 50 by means of keys 53, multivibrator 58 is reset via line 60, causing frequency switch 51 to connect

APPARATUS FOR CHANGING THE RELATIVE PHASE ANGLES OF OUTPUT SHAFTS OF A MULTIPLE MOTOR ELECTRIC DRIVE

This is a continuation, of application Ser. No. 19,562 filed Mar. 12, 1979.

BACKGROUND OF THE INVENTION

1. Field of the Invention

This invention relates to an apparatus for changing the relative phase angles of output shafts of an electric, multiple motor drive. More particularly, the invention relates to such arrangements in which the individual shafts are coupled to synchronous motors which can be connected to an operating static frequency changer having an output voltage which depends, as to frequency and phase, on the control frequency of a frequency generator.

2. Description of the Prior Art

Various production machines require the use of different speeds to accommodate the flow of articles or material. For instance, in the manufacture of bottles in a hollow-glass machine, different speeds are required at the different operating levels, e.g., the drop distributor, the control drum, etc.

However, the drives of the different speed levels must be in synchronism with each other. In addition, it must be possible to correct the mechanical phase of individual drives relative to one another; that is, it must be possible to reposition the output shafts by advancing or retarding the relative angle, so that, thereby, the flow of goods or material can be optimized.

This problem can be solved by using a decentralized drive, i.e., by using a separate synchronous motor for each operating level, and by supplying the motors from a central operating frequency changer; the motors will then be in synchronism. Heretofore in order to match the phase angle of the different output shafts to each other appropriately, a planetary drive (differential) has been used, with each drive being followed by such a transmission. In this way, the appropriate phase angle could be adjusted manually by means of a hand wheel.

It is an object of the present invention to replace the mechanical arrangement by an electrical arrangement, thereby improving operating convenience and reducing costs.

SUMMARY OF THE INVENTION

In accordance with the present invention, the problem described above is solved by providing a second frequency changer which has the same working voltage output amplitude as the first one and by providing means for connecting it to the same frequency generator as the operating frequency converter. The synchronous motor having the shaft whose phase angle is to be varied is switched to the second frequency changer without introducing shaft angle error. The frequency of the second, or phase-shifting, frequency changer is then varied in the direction of desired change of phase angle after it is switched to a second frequency generator. When the desired angle is reached, the phase-shifting frequency changer is then reconnected to the frequency generator of the operating frequency changer at a time when the phases of the output voltages of both frequency changers, as determined via a phase synchronizer, coincide. Then the synchronous motor is finally switched back to the operating frequency changer.

By using a combination of two static frequency changers, namely the operating and the phase-shifting changers, the mechanical differential is eliminated and the individual motors are set to the optimum mechanical phase angle by electrical means. In this way, fully adequate small angle resolution is obtainable at the output shaft with good angular tolerances. Influencing factors include the number of pole pairs of the motor and the reduction ratio of the fixed transmission, for example, a minimum angle change of 0.6 degrees can be set at the output shaft by using a six-pole synchronous motor and a transmission ratio of 1:200.

BRIEF DESCRIPTION OF THE DRAWINGS

FIG. 1 is a schematic diagram of the power part of the multiple-motor drive;

FIG. 2 is a block diagram showing the connection, on the control side, of the two frequency changers used in the phase shifting process; and FIG. 3 is a block diagram of an illustrative embodiment of a phase-shifter constructed in accordance with the teachings of the invention.

DETAILED DESCRIPTION OF THE INVENTION

FIG. 1 shows the connection, on the power side, between an operating frequency changer 1, a phase-shifting frequency changer 2 and a number of synchronous motors 6 and 7. The frequency changers are static frequency converters using thyristors in a manner well known in the art. Powered by a common supply line, they have the same output voltage amplitudes, but, as a rule, different operating power levels.

There are two variable frequency supply bus bars 13 and 23; bus bar 13 is supplied from frequency changer 1 and bus bar 23, from frequency changer 2. All synchronous motors 7 are connected via switches to the bus bar 13, the phase angle of which may be arbitrarily established and then maintained, since correction of phase angle is not required here.

The output shafts, not shown, which are driven by motors 6, on the other hand, must be variable as to mutual phase, depending on technical requirements of a particular situation, and must continue to run, rigidly locked in phase, thereafter. These motors can be connected via switches (contactors) 14 and 24 to supply bus bar 13 or 23, as required.

When the installation is started up, the high power operating frequency changer 1 takes the load, bringing all motors 6 and 7 up to the operating frequency. Subsequently, each motor 6 is corrected as to phase by means of phase-shifting frequency changer 2 and then switched back to frequency converter 1. These transfers are made with little shock from lack of synchronism by means of the control system to be described.

In the arrangement shown in FIG. 2, a synchronous motor 6, which, for instance, may drive a connected control drum through a transmission 8 having a transmission ratio U=1:200, can be connected by switch 14 to operating frequency changer 1 or by switch 24 to phase-shifting frequency changer 2, as desired. The operation of switches 14 and 24 is controlled by an interlock arrangement 52.

The voltage taken off a control potentiometer 31 is converted in a voltage-frequency converter 32 into a train of pulses having frequency f1 in a variable frequency pulse generator 3. The pulses produced by frequency generator 3, which includes potentiometer 31 frequency changer 1 and 2 for operation with its own frequency generator 3 and 4, respectively. At the same time, a correction voltage corresponding to the correction value ±Δf is applied to voltage-frequency converter 42 of frequency generator 4. This increases or decreases the frequency of phase-shifting frequency changer 2, but leaves the frequency of operating frequency changer 1 unchanged. When the key is released, the correction voltage is removed and multivibrator 58 is reset upon detection of phase equality of coincidence member 56. Thereupon, switch 51 is reversed and phase shifting frequency changer 2 is connected to frequency generator 3. If synchronism is not achieved within, say, 4 seconds after key 53 is released, a forced unbalance is inserted via amplifier 54 which gives, via the correction stage 50, an added correction value to frequency generator 4 until phase equality prevails.

What is claimed is:

1. In an arrangement comprising an electrical multiple-motor drive having plural output shafts, each output shaft being coupled to a synchronous motor, an operating static frequency changer having an output voltage coupled to the synchronous motors and having an input for a control frequency, the output of the operating static frequency changer depending as to frequency and phase on the control frequency at the input, and an operating frequency generator having an output coupled to the input of the operating static frequency changer, the improvement comprising:

apparatus to permit changing the relative angle between the output shaft of one synchronous motor and the output shaft of another synchronous motor including:

a phase-shifting frequency generator having a variable frequency output;

a phase-shifting static frequency changer having a control input and having the same voltage output level as the operating frequency changer;

means for varying the output frequency of the phase-shifting frequency generator;

synchronizing means having as inputs the output voltages of both static frequency changers for determining when the phases of the output voltages are in agreement and generating a control signal in response thereto;

first switching means for selectively coupling the input of the synchronous motor, the shaft angle of which is to be varied, to the output of the phase-shifting static frequency changer or to the output of the operating static frequency changer;

second switching means for selectively coupling the input of the phase-shifting static frequency changer to the output of the operating frequency generator; and means to permit operation of the first switching means only when the control signal indicating agreement in phase between the output voltages of the static frequency changers is present, whereby, when it is desired to vary the relative angle, the input of the synchronous motor being changed may be coupled by the first switching means to the output of the phase-shifting frequency changer, the input of the phase-shifting frequency changer may be coupled by the second switching means to the output of the frequency-shifting generator, the frequency of the frequency-shifting generator may be changed to carry out the change in relative angle, the input of the phase shifting frequency changer may be shifted back to the output of the operating frequency generator, and the input of the synchronous motor may be shifted back to the output of the operating frequency changer, with switching between the operating static frequency changer and the phase-shifting static frequency changer occurring substantially without phase angle error.

2. An apparatus in accordance with claim 1 in which the static frequency changers are controlled by firing pulses, and further comprising:

a first frequency divider having an input coupled to the output of the operating frequency generator, and an output;

a first logic part having an input coupled to the output of the first frequency divider and an output coupling firing pulses to the input of the operating static frequency changer;

a second frequency divider having an input, coupled to the output of the second switch means and an output; and a second logic part having an input coupled to the output of the second frequency divider and an output coupling firing pulses to the input of the phase-shifting static frequency changer;

the synchronizing means receiving inputs from the first and second logic parts and responding to agreement in phase therebetween.

3. An apparatus in accordance with claim 2 in which the synchronizing means comprises:

a coincidence element which generates the control signal.

4. An apparatus in accordance with any one of claims 1 to 3, in which the means to permit operation of the first switching means comprises an interlock responsive to the control signal for blocking transfer when the phases of the output voltages of the static frequency changers are in disagreement.

5. An apparatus in accordance with claim 4, in which the second switching means couples the input of the phase-shifting static converter to the output of the second frequency generator when the control signal indicates a difference in phase angle between the static frequency changers and couples the input of the phase-shifting static converter to the output of the operating frequency converter when the phase angles are in agreement.

6. An apparatus in accordance with claim 5 in which the output frequency of the phase-shifting generator is spaced apart from the output frequency of the operating frequency generator by a predetermined drift frequency.

* * * * *